(12) United States Patent
Kataoka et al.

(10) Patent No.: US 10,481,464 B2
(45) Date of Patent: Nov. 19, 2019

(54) OPTICAL MODULATOR WITH WIRINGS OF EQUAL LENGTH

(71) Applicant: SUMITOMO OSAKA CEMENT CO., LTD., Tokyo (JP)

(72) Inventors: Toshio Kataoka, Tokyo (JP); Kei Kato, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/516,028

(22) PCT Filed: Apr. 28, 2016

(86) PCT No.: PCT/JP2016/063376
§ 371 (c)(1),
(2) Date: Mar. 31, 2017

(87) PCT Pub. No.: WO2016/175289
PCT Pub. Date: Nov. 3, 2016

(65) Prior Publication Data
US 2017/0299940 A1    Oct. 19, 2017

(30) Foreign Application Priority Data
Apr. 28, 2015   (JP) ................. 2015-092290

(51) Int. Cl.
*G02F 1/225*   (2006.01)
*G02B 6/125*   (2006.01)
(Continued)

(52) U.S. Cl.
CPC ........... *G02F 1/2257* (2013.01); *G02B 6/125* (2013.01); *G02B 6/243* (2013.01); *G02B 2006/12142* (2013.01); *G02F 2001/212* (2013.01)

(58) Field of Classification Search
CPC ................. G02B 2006/12142; G02B 6/12; G02B 6/125; G02B 6/24; G02B 6/243;
(Continued)

(56) References Cited

U.S. PATENT DOCUMENTS 6,580,843 B2 * 6/2003 Doi ..................... G02F 1/2255
385/14
7,099,596 B2 * 8/2006 Watanabe ............ H04B 10/504
372/29.01

(Continued)

FOREIGN PATENT DOCUMENTS

JP    2010-185978    8/2010
JP    2010-286770    12/2010
(Continued)

OTHER PUBLICATIONS

"International Search Report (Form PCT/ISA/210) of PCT/JP2016/063376", dated Aug. 2, 2016, with English translation thereof, pp. 1-4.

*Primary Examiner* — Andrew Jordan
(74) *Attorney, Agent, or Firm* — JCIPRNET

(57) ABSTRACT

The objective of the present invention is to provide an optical modulator adapted for use with various modulating units and various modulation regions, and with which variability in optical losses is limited as far as possible. An optical modulator in which an optical waveguide and a control electrode for controlling an optical wave propagating through the optical waveguide are provided in a substrate, characterized in that: the optical waveguide is provided with a first branching portion which causes one input light beam to branch into two light beams; each of a first and a second modulating portion connected to two branched waveguides which branch at the first branching portion is provided with a structure in which one or more Mach-Zehnder type optical waveguides are combined; the control electrode comprises (Continued)

signal electrodes which apply modulated signals to the first and second modulating portions; input portions of all the signal electrodes are disposed on either the left or the right of the substrate relative to the direction in which the optical wave propagates; and in relation to output portions of the signal electrodes, the output portions of the signal electrodes led out from each modulating portion are disposed on the side on which the first or second modulating portions are disposed, relative to the direction in which the optical wave propagates.

5 Claims, 2 Drawing Sheets

(51) Int. Cl.
G02B 6/24 (2006.01)
G02B 6/12 (2006.01)
G02F 1/21 (2006.01)

(58) Field of Classification Search
CPC .......... G02F 1/21; G02F 1/225; G02F 1/2257; G02F 2001/212
See application file for complete search history.

(56) References Cited

U.S. PATENT DOCUMENTS

| | | | |
|---|---|---|---|
| 8,078,015 B2 | 12/2011 | Sugiyama | |
| 8,432,599 B2* | 4/2013 | Cho | B82Y 20/00 359/245 |
| 8,467,634 B2 | 6/2013 | Sugiyama | |
| 9,046,703 B2* | 6/2015 | Fukuda | G02F 1/0121 |
| 9,081,216 B2* | 7/2015 | Sugiyama | G02F 1/225 |
| 9,229,292 B2 | 1/2016 | Sugiyama et al. | |
| 9,231,728 B2* | 1/2016 | Sugiyama | H04J 14/06 |
| 9,423,667 B2* | 8/2016 | Matsumoto | G02F 1/2255 |
| 9,703,168 B2* | 7/2017 | Sugiyama | G02F 1/0121 |
| 9,791,723 B2* | 10/2017 | Banaei | G02F 1/065 |
| 9,817,294 B2* | 11/2017 | Goi | G02F 1/2257 |
| 10,078,253 B2* | 9/2018 | Hosokawa | G02F 1/035 |
| 2003/0180054 A1* | 9/2003 | Watanabe | H04B 10/504 398/182 |
| 2009/0238512 A1* | 9/2009 | Sugiyama | G02F 1/035 385/2 |
| 2010/0202784 A1* | 8/2010 | Sugiyama | G02F 1/2255 398/183 |
| 2010/0246629 A1* | 9/2010 | Fujii | H01S 5/4068 372/50.121 |
| 2010/0316326 A1* | 12/2010 | Sugiyama | G02F 1/225 385/3 |
| 2012/0087653 A1* | 4/2012 | Sawada | H04B 10/516 398/25 |
| 2012/0140309 A1* | 6/2012 | Cho | B82Y 20/00 359/260 |
| 2013/0195394 A1* | 8/2013 | Hosokawa | H04B 10/5053 385/3 |
| 2013/0251303 A1* | 9/2013 | Sugiyama | G02F 1/225 385/3 |
| 2013/0270418 A1* | 10/2013 | Cho | G02F 1/015 250/206.1 |
| 2014/0241659 A1* | 8/2014 | Fukuda | G02F 1/0121 385/3 |
| 2015/0063809 A1* | 3/2015 | Sugiyama | H04J 14/06 398/65 |
| 2015/0078763 A1* | 3/2015 | Sugiyama | G02F 1/225 398/200 |
| 2015/0378238 A1* | 12/2015 | Matsumoto | G02F 1/2255 385/2 |
| 2017/0255032 A1* | 9/2017 | Kataoka | G02F 1/03 |
| 2018/0039152 A1* | 2/2018 | Furuya | G02B 26/0841 |
| 2018/0196328 A1* | 7/2018 | Furuya | G02F 1/225 |
| 2018/0284494 A1* | 10/2018 | Miyazaki | G02F 1/0327 |

FOREIGN PATENT DOCUMENTS

| | | |
|---|---|---|
| JP | 2012-215678 | 11/2012 |
| JP | 6439838 | 3/2014 |
| JP | 2014-199302 | 10/2014 |
| JP | 2015-055840 | 3/2015 |

* cited by examiner

US 10,481,464 B2

OPTICAL MODULATOR WITH WIRINGS OF EQUAL LENGTH

CROSS-REFERENCE TO RELATED APPLICATION

This application is a 371 application of the International PCT application serial no. PCT/JP2016/063376, filed on Apr. 28, 2016, which claims priority benefits of Japan Patent Application No. 2015-092290 filed on Apr. 28, 2015. The entirety of each of the abovementioned patent applications is hereby incorporated by references herein and made a part of this specification.

BACKGROUND OF THE INVENTION

Field of the Invention

The present invention relates to an optical modulator, and more particularly, to an optical modulator including, on a substrate, an optical waveguide and a control electrode for controlling light waves propagating through the optical waveguide.

Description of Related Art

In recent years, with a progression toward high frequency and large capacity of optical communication systems, a broad band or small optical modulator used for the optical communication system has come to be required. In particular, various members constituting the optical modulator are being integrated. For example, an optical modulator of which a modulation frequency is equal to or higher than 100 GHz has a 4-channel structure in which four modulation signals are integrated. Further, handling of signal wirings in the optical modulator has become complicated, which causes deterioration of the characteristics of the optical modulator.

Integration or mountability is prioritized in an optical modulator of the related art. Accordingly, for example, termination of 4-channel electrical signals is performed in one termination substrate, as illustrated in FIG. 1. In FIG. 1, a plurality of Mach-Zehnder type optical waveguides 2 are integrated and arranged on a substrate 1 having an electrooptic effect such as lithium niobate. In the optical waveguide 2 (dotted line portion), an input waveguide is branched into two branched waveguides 21 and 22 by a first light branching section 20, and first and second modulation portions including Mach-Zehnder type optical waveguides M1 and M2 are connected to the respective branched waveguides. In FIG. 1, each modulation portion includes a nested optical waveguide, sub Mach-Zehnder type optical waveguides m1 to m4 are further incorporated into main Mach-Zehnder type optical waveguides M1 and M2 in a nested type, and a total of four modulation regions are formed.

Further, signal electrodes s1 to s4 for applying modulation signals are provided in the respective modulation regions. In FIG. 1, signal wirings extending from a relay substrate 3 to a termination substrate 4 via the signal electrodes in the substrate 1 are shown simply as solid lines s1 to s4. Further, although a ground electrode is usually arranged around the signal electrodes, no ground electrode is illustrated in FIG. 1 so that a structure of the optical modulator can be easily understood. Wirings corresponding to the signal electrodes s1 to s4 are formed in the relay substrate 3, and the relay substrate 3 and the substrate 1 are connected to each other by wire bonding using a gold wire or the like. One end portion of each of the signal electrodes s1 to s4 in the substrate 1 is an input portion connected to the relay substrate 3 using a gold wire, and the other end portion thereof is an output portion connected to the termination substrate 4 using another gold wire.

In FIG. 1, a termination circuit is formed as one termination substrate 4 in order to terminate a 4-channel modulation signal. In the configuration illustrated in FIG. 1, it is necessary to arrange the signal electrodes s3 and s4 across the optical waveguides on the substrate 1, as indicated by a dash-dotted line frame A. In such an electrode arrangement configuration, there is a problem in that light waves propagating through the optical waveguide may be absorbed or scattered by the electrodes, and an excessive optical loss may occur. In particular, in an optical modulator of 100 GHz or more, it is desirable for variation in an optical loss of each optical waveguide to be zero when possible. An optical modulator in which output portions of all the signal electrodes are concentrated and arranged on any one of the left and right sides of the substrate 1 in a propagation direction of light waves (a direction from the right to the left in FIG. 1), as in FIG. 1, is disclosed in Patent Literature 1, or the like. An arrow L1 indicates light waves that are input to the substrate 1, and arrows L2 and L3 indicate light waves output from the substrate 1.

CITATION LIST

Patent Literature

Patent Literature 1: Japanese Patent No. 5439838

SUMMARY OF THE INVENTION

Technical Problem

An object of the present invention is to solve the above-described problem and to provide an optical modulator in which variation in an optical loss corresponding to each modulation portion or each modulation region s suppressed as much as possible.

Solution to Problem

In order to solve the above problem, the optical modulator of the present invention has the following technical features.

(1) In an optical modulator including, on a substrate, an optical waveguide and a control electrode for controlling light waves propagating through the optical waveguide, the optical waveguide includes a first light branching section that branches one input light beam into two, each of first and second modulation portions, which are connected to two branched waveguides branched in the first light branching section, having a structure in which one or more Mach-Zehnder type optical waveguides are combined, the control electrode includes signal electrodes that apply a modulation signal to the first and second modulation portions, input portions of all the signal electrodes are arranged on any one of the left and right sides of the substrate in a propagation direction of the light waves, and an output portion of the signal electrode, in the propagation direction of the light waves is arranged on each side of the substrate on which the first or second modulation portion is arranged.

(2) In the optical modulator described in (1), lengths of wirings from a start portion to an output portion of an interaction region in the modulation portion are set to be equal between the different signal electrodes.

(3) In the optical modulator described in (1) or (2), a termination substrate including a termination circuit connected to each output portion is arranged near the output portion.

(4) The optical modulator described in (3) includes: a DC wiring for applying a DC bias voltage to the modulation portion or an optical waveguide in a stage subsequent to the modulation portion, at least a portion of the DC wiring being formed in a portion of the termination substrate.

(5) In the optical modulator described in (4), a resistor in a range of 100Ω to 10 kΩ is provided in the DC wiring arranged in the termination substrate.

(6) The optical modulator described in any one of (3) to (5) includes a light reception element that monitors some of the light waves derived from the modulation portion, a portion of a wiring to the light reception element being formed in a portion of the termination substrate.

(7) In the optical modulator described in (6), a groove is formed or a conductor is arranged between the termination circuit and the wiring of the light reception element on a surface of the termination substrate.

Advantageous Effects of Invention

According to the present invention, in the optical modulator including, on a substrate, an optical waveguide and a control electrode for controlling light waves propagating through the optical waveguide, the optical waveguide includes a first light branching section that branches one input light beam into two, each of first and second modulation portions, which are connected to two branched waveguides branched in the first light branching section, having a structure in which one or more Mach-Zehnder type optical waveguides are combined, the control electrode includes signal electrodes that apply a modulation signal to the first and second modulation portions, input portions of all the signal electrodes are arranged on any one of the left and right sides of the substrate in a propagation direction of the light waves, and an output portion of the signal electrode, in the propagation direction of the light waves, is arranged on each side of the substrate on which the first or second modulation portion is arranged. Thus, it is possible to reduce the number of control electrodes crossing the optical waveguides, and to suppress the occurrence of or variation in an optical loss.

DETAILED DESCRIPTION OF THE INVENTION

Hereinafter, an optical modulator according to the present invention will be described in detail.

Figure 1:
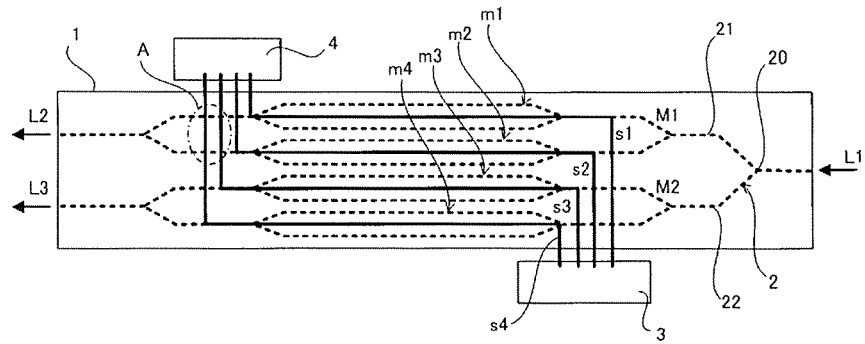
FIG. 1 is a diagram schematically illustrating an optical modulator of the related art.
Figure 2:
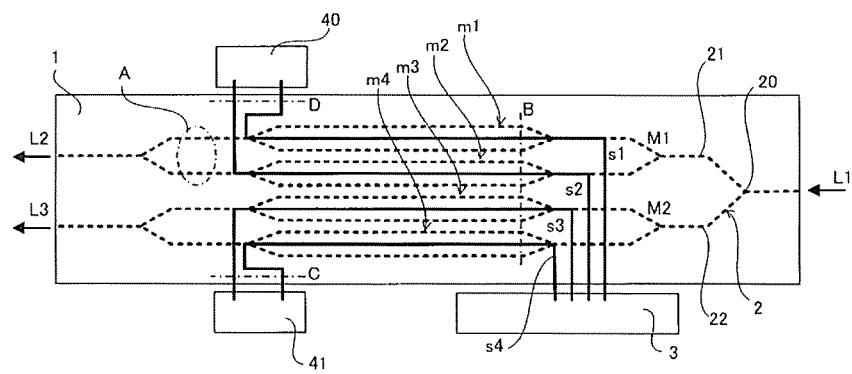
FIG. 2 is a schematic diagram illustrating an optical modulator according to a first embodiment of the present invention.

An optical modulator according to an aspect of the present invention is an optical modulator including, on a substrate 1, an optical waveguide 2 and a control electrode for controlling light waves propagating through the optical waveguide 2, in which the optical waveguide 2 includes a first light branching section 20 that branches one input light beam into two, each of first and second modulation portions M1 and M2, which are connected to two branched waveguides 21 and 22 branched in the first light branching section, having a structure in which one or more Mach-Zehnder type optical waveguides M1 and M2 and m1 to m4 are combined, the control electrode includes signal electrodes s1 to s4 that apply a modulation signal to first and second modulation portions, input portions of all the signal electrodes are arranged on any one of the left and right sides of the substrate 1 (any one of the upper side and the lower side of the substrate 1 in FIG. 2) in a propagation direction of the light waves (a direction from the right to the left in FIG. 2), and an output portion of the signal electrode, in the propagation direction of the light waves, is arranged on each side of the substrate on which the first or second modulation portion is arranged, as illustrated in FIG. 2.

A substrate having an electrooptic effect such as $LiNbO_3$, $LiTaO_5$, or PLZT (lead lanthanum zirconate titanate) is preferably used as the substrate 1 used in the optical modulator of the present invention. Further, the optical waveguide 2 that is formed on the substrate is formed, for example, by thermally diffusing a high refractive index material such as titanium (Ti) onto a $LiNbO_3$ substrate (an LN substrate). Further, a ridge type optical waveguide in which irregularities along the optical waveguide are formed on the substrate can also be used. Further, although the optical modulator using an X-cut type substrate is illustrated in FIG. 2, the present invention is not limited thereto and can be similarly applied to a Z-cut type substrate. Further, a semiconductor material can also be used as the substrate 1.

The control electrode includes signal electrodes s1 to s4 and a ground electrode (not illustrated) corresponding to the first and second modulation portions M1 and M2 or respective Mach-Zehnder type optical waveguides (modulation regions m1 to m4) constituting the respective modulation portions. Further, the control electrode also includes a DC electrode for applying a DC bias voltage, or the like, as will be described below. The control electrode can be formed by forming an electrode pattern of Ti.Au on a surface of the substrate 1 and using a gold plating method, or the like. Further, a buffer layer such as dielectric $SiO_2$ can be formed on the substrate surface after the optical waveguide formation, as necessary, and a modulation electrode can be formed on the upper side of the buffer layer.

A relay substrate 3 and termination substrates 40 and 41 are arranged near the substrate 1. A modulation signal from an external signal source is introduced in the relay substrate 3, and the relay substrate 3 serves to relay the modulation signal to the signal electrodes s1 to s4 of the substrate 1 via signal wirings in the relay substrate. Needless to say, one end of a connector connected to the external signal source can be directly connected to the respective signal electrodes s1 to s4 of the substrate 1 and a ground electrode corresponding thereto, and the relay substrate 3 can be omitted.

In the termination substrates 40 and 41, a termination circuit including a resistor or the like for suppressing reflection of the modulation signal is provided on the substrates 40 and 41. For an electrical connection between the relay substrate 3 and the substrate 1 or an electrical connection between the substrate 1 and the termination substrates 40 and 41, a conductive wire, a conductive ribbon, or the like with high conductivity such as a gold wire or a gold ribbon can be used. The termination substrate is not limited to being arranged on a side surface of the substrate 1, and may be arranged on the upper side or the lower side of the substrate 1. Further, the termination substrate may be removed and a resistor may be arranged (or directly arranged) on either an upper surface, a side surface, or a lower surface of the substrate 1 as long as the modulation portions are not affected.

In the embodiment of FIG. 2, since the output portions of the signal electrodes s1 to s4 used in the respective modulation portions M1 and M2 are arranged on the side on which the respective modulation portions M1 and M2 are formed in the propagation direction of the light waves (the direction from the right to the left in FIG. 2), it is possible to suppress the number of control electrodes such as the signal electrodes crossing the optical waveguides as indicated by a dash-dotted line frame A. As a result, it is possible to reduce the occurrence of and variation in an optical loss. Input light L1 incident on the optical modulator is modulated by the respective modulation portions M1 and M2 or m1 to m4 and emitted as output light L2 and L3. The output light L2 and L3 is combined in a polarization combination optical system (not illustrated) or the like, as necessary.

Further, in the optical modulator of the present invention, lengths of wirings from a start portion (dash-dotted line B) of an interaction region in the modulation portions M1 and M2 or m1 to m4 (a range in which an electrical field formed by a modulation signal is applied to the optical waveguide) to the output portion (dash-dotted line C or D) are set to be equal between the different signal electrodes s1 to s4, as illustrated in FIG. 2. By adopting such wirings having the same length, it is possible to align the frequency characteristics of electrical reflection when the modulation signal is reflected in the termination circuits, and to obtain more stable modulation characteristics.

Further, the times taken for the modulation signal input from the external signal source to reach the start portions of the respective interaction regions of the substrate 1 from the external signal source may be equalized between the modulation signals. Accordingly, timings of start of the modulation can be easily aligned and a function of adjusting a phase of the modulation signal can be omitted in the external signal source. Further, intensities of the modulation signal reaching the start portions of the interaction regions can also be equalized between the modulation signals. For this purpose, in the substrate 1, the lengths of wirings from the input portion to the start portions of the interaction regions may be aligned between the respective signal electrodes. When the wirings are not aligned, start timings of modulation can be aligned by adjusting the lengths of wirings on the relay substrate, wirings on an electrical circuit substrate on which the optical modulator is arranged, or wirings of a flexible circuit substrate (FPC) or the like that connects the optical modulator to the electrical circuit substrate.

As illustrated in FIG. 2, the termination substrates 40 and 41 including the termination circuits connected to the output portions of the signal electrodes s1 to s4 are arranged near the respective output portions of the signal electrodes s1 to s4.

Figure 3:
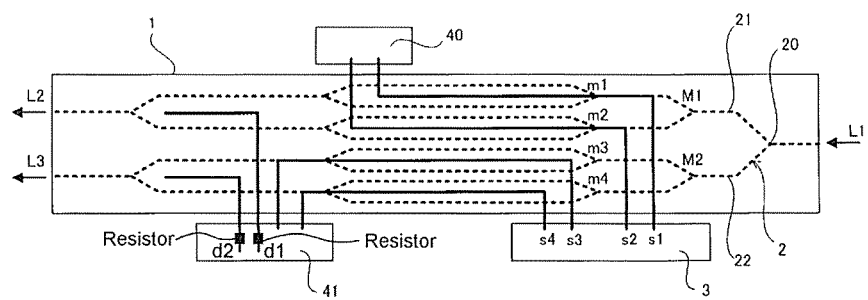
FIG. 3 is a schematic diagram illustrating an optical modulator according to a second embodiment of the present invention.

A second embodiment of the optical modulator according to the present invention is illustrated in FIG. 3. In FIG. 3, the optical modulator includes DC wirings d1 and d2 for applying a DC bias voltage to the modulation portions (M1 and M2 or modulation regions m1 to m4) or optical waveguides in a stage subsequent to the modulation portions. At least a portion of each DC wiring is formed in a portion of a termination substrate 41.

Thus, by arranging the termination circuit and the DC wirings on the same substrate, the number of components is decreased, which contributes to simplification of assembly work and the reduction of cost.

Further, a resistor in a range of 100Ω to 10 kΩ is provided in the DC wiring arranged on the termination substrate 41. Accordingly, it is possible to reduce crosstalk between the termination circuit and the DC wiring, external noise, and static electricity.

Figure 4:
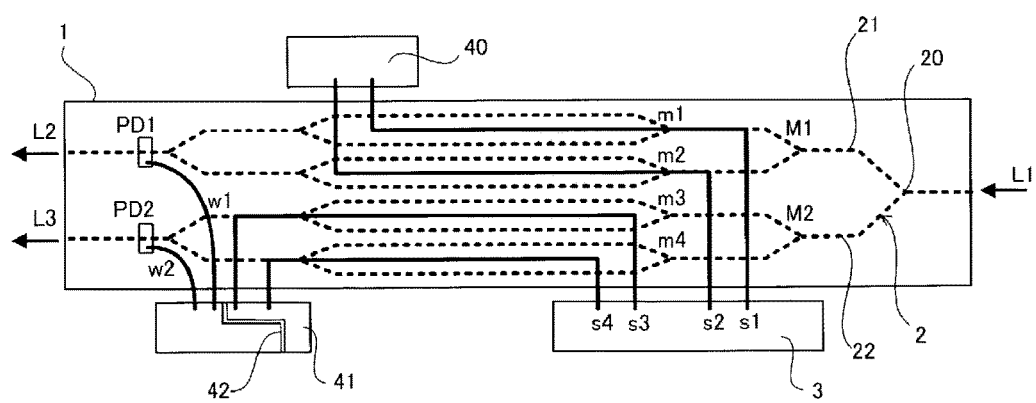
FIG. 4 is a schematic diagram illustrating an optical modulator according to a third embodiment of the present invention.

A third embodiment of the optical modulator according to the present invention is illustrated in FIG. 4. In FIG. 4, the optical modulator includes light reception elements (PD1 and PD2) that monitor some of the light waves (output signal light or radiation light from a wave combination unit) derived from modulation portions M1 and M2 or m1 to m4. A portion of a wiring to the light reception element is formed in a portion of a termination substrate. Although gold wires w1 and w2 are illustrated as means for electrically connecting the light reception element to the termination substrate 41 in FIG. 4, a signal wiring for deriving an output signal of the light reception element can also be provided on the substrate 1 as necessary.

Signal wirings (not illustrated) for deriving output signals from the light reception elements PD1 and PD2 to the outside are formed in the termination substrate 41 of FIG. 4. In order to reduce crosstalk between a termination circuit in the termination substrate 41 and the wirings of the light reception elements, a groove 42 may be formed or a conductor may be arranged between the termination circuit and the wirings of the light reception elements on the surface of the termination substrate 41. Such a groove or conductor can also be provided between the termination circuit of the termination substrate 41 and a DC wiring in FIG. 3.

INDUSTRIAL APPLICABILITY

As described above, according to the present invention, it is possible to provide an optical modulator in which the variation in an optical loss corresponding to each modulation portion or each modulation region is suppressed as much as possible.

REFERENCE SIGNS LIST

1 Substrate
2 Optical waveguide
20 First light branching section (optical waveguide)
21, 22 Branched waveguide
3 Relay substrate
4, 40, 41 Termination substrate
42 Groove or conductor
M1, M2 Main Mach-Zehnder type optical waveguide
m1 to m4 Sub Mach-Zehnder type optical waveguide
s1 to s4 Signal electrodes (signal wiring)
d1, d2 DC Wiring
PD1, PD2 Light reception element
w1, w2 Gold wire
L1 Input light
L2, L3 Output light

What is claimed is:
1. An optical modulator comprising, on a substrate, an optical waveguide and a control electrode for controlling light waves propagating through the optical waveguide, wherein the optical waveguide includes a first branch section that branches one input light beam into two, each of first and second modulation portions, which are connected to two branched waveguides branched in the first branch section, having a structure in which one or more Mach-Zehnder type optical waveguides are combined, the control electrode includes signal electrodes that apply a modulation signal to the first and second modulation portions, input portions of all the signal electrodes that are configured to input modulation signal to the first and second modulation portions and that are arranged on any one of the left and right sides of the substrate in a propagation direction of the light waves, output portions of the signal electrodes that are configured to output the modulation signal from the first and second modulation portions and that, in the propagation direction of the light waves, are arranged on both sides of the substrate on which the first or second modulation portion is arranged, wherein each of the signal electrodes has at least one of the output portions located on one side of the substrate, at least two termination substrates, each of the termination substrates including a termination circuit connected to each output portion is arranged near the output portion, wherein one of the termination substrates is disposed on the side on which the first modulation portion is arranged and another one of the termination substrates is disposed on the other side on which the second modulation portions is arranged, the output portions of a part of the signal electrodes are extended from the first modulation portion to the one of the terminal substrates, and the output portions of another part of the signal electrodes are extended from the second modulation portion to the other one of the terminal substrates, a DC wiring that is not electrically connected to the signal electrode is included to apply a bias voltage to the modulation portion or an optical waveguide in a stage subsequent to the modulation portion, a light reception element that monitors some of the light waves derived from the modulation portion and is arranged on the substrate, and a monitor wiring that derives an output signal from the light reception element are included, and at least a portion of the DC wiring or the monitor wiring is forming in a portion of the termination substrate, wherein lengths of wirings from a start portion of an interaction region in the modulation portion to the output portion are set to be equal between the different signal electrodes.

2. The optical modulator according to claim 1, wherein a resistor in a range of 100Ω to 10 kΩ is provided in the DC wiring arranged in the termination substrate.

3. The optical modulator according to claim 1, wherein a groove is formed or a conductor is arranged between the termination circuit and the monitor wiring which are arranged on a surface of the termination substrate.

4. The optical modulator according to claim 1, wherein a resistor in a range of 100Ω to 10 kΩ is provided in the DC wiring arranged in the termination substrate.

5. The optical modulator according to claim 1, wherein a groove is formed or a conductor is arranged between the termination circuit and the monitor wiring which are arranged on a surface of the termination substrate.

* * * * *